(12) United States Patent
Garfunkel et al.

(10) Patent No.: US 8,243,399 B2
(45) Date of Patent: Aug. 14, 2012

(54) SHIELD DESIGN FOR MAGNETIC RECORDING HEAD

(75) Inventors: Glen Garfunkel, San Jose, CA (US); Moris Dovek, San Jose, CA (US); Kenichi Takano, Cupertino, CA (US); Joseph Smyth, Aptos, CA (US); Yuchen Zhou, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/066,084

(22) Filed: Apr. 6, 2011

(65) Prior Publication Data

US 2011/0188156 A1 Aug. 4, 2011

Related U.S. Application Data

(62) Division of application No. 11/888,856, filed on Aug. 2, 2007, now abandoned.

(51) Int. Cl.
*G11B 5/39* (2006.01)

(52) U.S. Cl. .............. 360/319; 360/123.12; 360/123.37; 360/123.58

(58) Field of Classification Search .................. 360/319, 360/123.12, 123.37, 123.58
See application file for complete search history.

(56) References Cited

U.S. PATENT DOCUMENTS

| 6,222,702 | B1 | 4/2001 | Macken et al. |
| 6,710,982 | B2 * | 3/2004 | Mack et al. ................... 360/319 |
| 6,967,823 | B2 | 11/2005 | Nakamoto et al. |
| 7,599,152 | B2 | 10/2009 | Guan et al. |
| 7,646,564 | B2 | 1/2010 | Maruyama et al. |
| 7,649,711 | B2 | 1/2010 | Ho et al. |
| 2006/0245113 | A1 | 11/2006 | Guan et al. |
| 2007/0035878 | A1 | 2/2007 | Guthrie et al. |

\* cited by examiner

*Primary Examiner* — Allen Heinz
(74) *Attorney, Agent, or Firm* — Saile Ackerman LLC; Stephen B. Ackerman

(57) ABSTRACT

A magnetic shield in which all domain patterns and orientations are stable and which are consistently repeated each time the shield is exposed to an initialization field, is disclosed. This is achieved by giving it a suitable shape which ensures that all closure domains can align themselves at a reduced angle relative to the initialization direction while still being roughly antiparallel to each other. Most, though not all, of these shapes are variations on trapezoids.

2 Claims, 6 Drawing Sheets

SHIELD DESIGN FOR MAGNETIC RECORDING HEAD

This is a divisional application of U.S. patent application Ser. No. 11/888,856, filed on Aug. 2, 2007, and now abandoned, which is herein incorporated by reference in its entirety, and assigned to a common assignee.

FIELD OF THE INVENTION

The invention relates to the general field of magnetics with particular reference to magnetic shields included in magneto-resistive devices and how to stabilize them.

BACKGROUND OF THE INVENTION

Non-hysteretic, repeatable, and substantially linear responses of the sensor and shields (S1 and S2) are to be preferred in a magnetic read-write head. The key contributors are to such nonlinear and hysteretic responses are uncontrolled magnetic domains in the shields. Examples relating to various shield domain configurations are shown in FIGS. 1-3. Originally obtained as micro-Kerr images, they are presented here as line drawings, in the interests of improved clarity. These responses are typical of what is seen in the prior art.

The current (prior art) design standard for shields is to give them a rectangular (or close to rectangular) shape, as exemplified by the shapes shown in FIGS. 1-3, whose width to height ratio may vary, and with an edge cut possibly added (e.g. as shown as feature 31 in FIG. 3). In the shield shown in FIG. 1 there is a single domain 11 extending along the bottom ABS 12 (air bearing surface) edge of the shield and an opposing domain 13 along the top edge; this is referred to as a '2-domain' state, because of its two primary longitudinal domains. In FIG. 2, a vertically oriented domain 21 is seen near the center of the shield, with opposing domains 22 and 23 on either side of 21. We refer to domain 21 as a 'diamond, domain.' In addition, a '3-domain' state, as shown in FIG. 3, can occur as well as variations thereon.

Two types of problem relating to these configurations can occur in current shield designs: either the domain wall locations may be undesirable or the domain orientation may be undesirable. For example, there may be a desired repeatable orientation of the ABS domain with respect to the applied field. The present invention discloses a general solution to this problem, including a methodology for designing stable shields through control of their shapes.

The first of these approaches relates to domain configurations similar to that shown in FIG. 2. The vertically oriented diamond domain 21 in FIG. 2 can interfere with the response of the head, giving a response to an applied field that is different from that given by heads whose shields do not have such a domain (e.g. FIG. 1 or FIG. 3). The head's sensor element's response is sensitive to fringe fields emanating from the shield part adjacent to the sensor, so that shield domain differences can lead to differences in sensor response. The unfavorable domain orientation seen in FIG. 2 is nucleated by the parallel closure domains 22 and 23 that get locked into their parallel orientation during the initialization process.

The second problem, also solved by the new shield shapes disclosed here, is illustrated in FIG. 4. Here, even though there are no internal domains, there are two single domains 41 and 42 of opposite orientation—one along the top edge and one along the bottom edge. The problem is that opposite orientations can arise for different heads, or in the same head, for each re-initialization. The response of the head, especially its signal amplitude, will vary, depending on which of these two orientations it happens to be in.

A routine search of the prior art was performed with the following references of interest being found:

Headway application Ser. Nos. 11/117,672 filed Apr. 28, 2005 and 11/117,673 filed Apr. 28, 2005, disclose addition to a shield of a pair of tabs located at the edges closest to the ABS. These tabs serve to prevent flux concentrating at the edges so that horizontal fields at these edges are significantly reduced. Alternatively, the tabs may be omitted and, instead, outer portions of the shield's lower edge may be shaped so as to slope upwards away from the ABS.

U.S. Patent Application 2006/0203384 (Maruyama et al) teaches that the reversed trapezoidal shield shape has advantages, but proposes a method of forming a rectangular shape having the qualities of the reversed trapezoidal shape. U.S. Pat. No. 6,222,702 (Macken et al) shows a shield having a hexagonal shape and so designed that the W to H ratio provides an ideal magnetic domain structure and so that triangular shaped closure magnetic domains assure the domain walls do not move.

U.S. Patent Application 2007/0035878 (Guthrie et al) describes a notch in a trailing shield that helps align the main pole to the trailing shield. U.S. Patent Application 2006/0092566 (Ho et al) shows a shield in FIG. 6 that looks like the shield in FIG. 12 of the invention. U.S. Pat. No. 6,967,823 (Nokamoto et al) shows a main pole that has a trapezoidal shape. The shield has a domain stabilization layer.

SUMMARY OF THE INVENTION

It has been an object of at least one embodiment of the present invention to provide a shield, for use in magnetic read-write heads, in which all domain patterns and orientations are stable and which are consistently repeated each time said shield is exposed to an initialization field.

Another object of at least one embodiment of the present invention has been to provide a method for forming such a shield.

These objects have been achieved by giving the shield a suitable shape which ensures that all closure domains can align themselves at a reduced angle relative to the initialization direction while still being roughly antiparallel to one another thereby ensuring the presence of only one domain at each non-parallel edge, and reducing the likelihood of embedded diamond domain formation.

The following is a non-exhaustive list of the shapes that can be shown to satisfy the above requirements with regard to the domain patterns that they support:

Trapezoids, modified trapezoids, assisted trapezoids, hexagons, irregular octagons, notched quadrilaterals, and trapezoids modified to have reduced contact with the ABS. In addition to providing domain stability, these shapes also result in the directions of magnetization of the domains being consistent and reproducible from one initialization to another.

BRIEF DESCRIPTION OF THE DRAWINGS

FIG. 9c is an irregular hexagon formed by removing the lower rectangular section from FIG. 9a.

DESCRIPTION OF THE PREFERRED EMBODIMENTS

Figure 1:
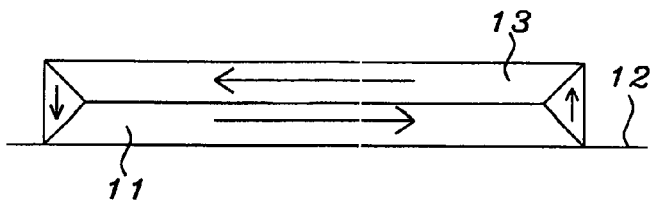
FIG. 1 shows a rectangular shaped shield, with varying aspect ratios, that is common in current shield designs. The ideal domain pattern shown there (single domain extending along bottom edge of shield} is difficult to achieve in existing shield designs.
Figure 2:
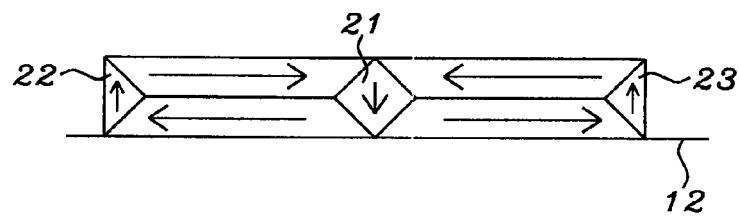
FIG. 2 shows how a diamond domain is formed when the right and left side closure domains are parallel.
Figure 3:
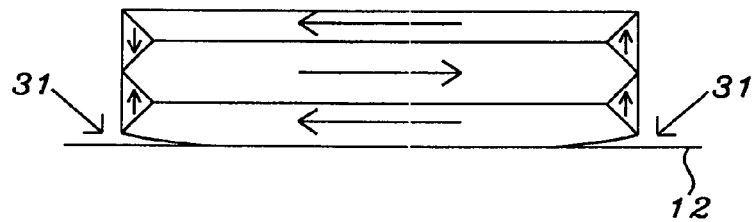
FIG. 3. illustrates a '3-domain' state having three dominant horizontal domains. This state can be desirable or undesirable, depending on design.
Figure 4:
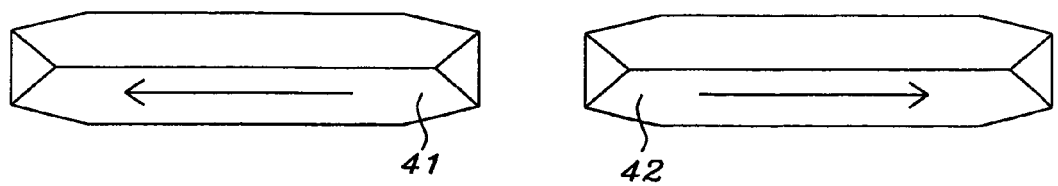
FIG. 4. is an example where single domains along top and bottom edges have been achieved but with opposite orientations in different devices and/or upon re-initialization.
Figure 5A:
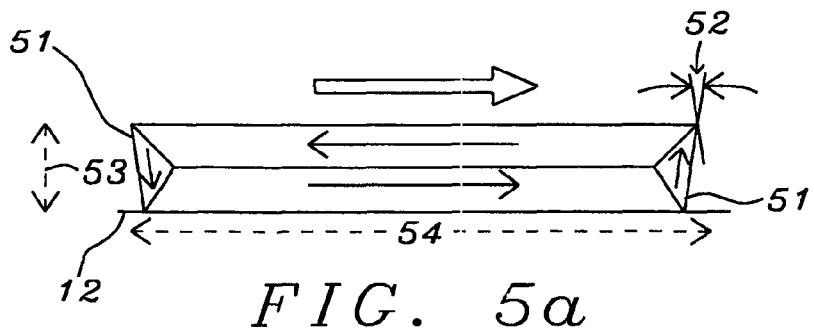
FIG. 5a shows how a trapezoidal shield shape leads to the same domain configuration when exposed to the same initialization direction.
Figure 5B:
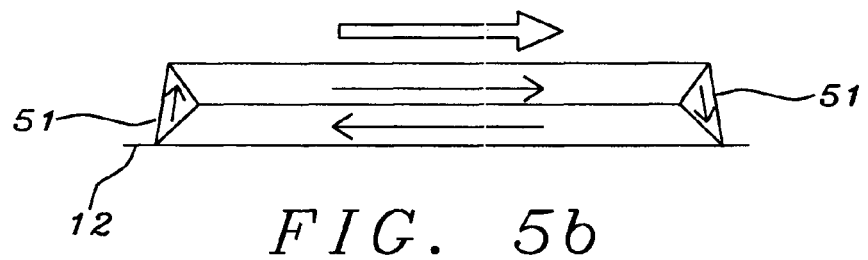
FIG. 5b is similar to 5a but with the wider of the parallel edges being the one that is at the ABS.

The present invention discloses a number of novel shield shapes which prevent the occurrence of the domain variability described above. The trapezoidal shield shape designs shown in FIGS. 5a and 5b are examples of preferred embodiments. During initialization, the orientation of the closure domains 51 at the left and right sides allows them to be aligned at a reduced angle relative to the initialization direction (along the X-axis of this figure) while still being roughly antiparallel to one another. This assures the presence of only one domain at each of the non-parallel edges, thereby eliminating the need for embedded diamond domains.

The inverted shape shown in FIG. 5b provides a similar solution to domain variability, but with opposite orientation of the ABS domain. The choice between shape 5a or 5b will depend on the particular head design. Use of trapezoids, such as shown in FIG. 5 (or related shapes), ensures that the domain orientations becomes consistently repeatable. As a general rule, the angle 52 between the parallel and non-parallel edges ranges from −60 to +60 degrees while the trapezoids have a mean width 54 to height 53 ratio of between about 0.5 and 10.

Figure 8:
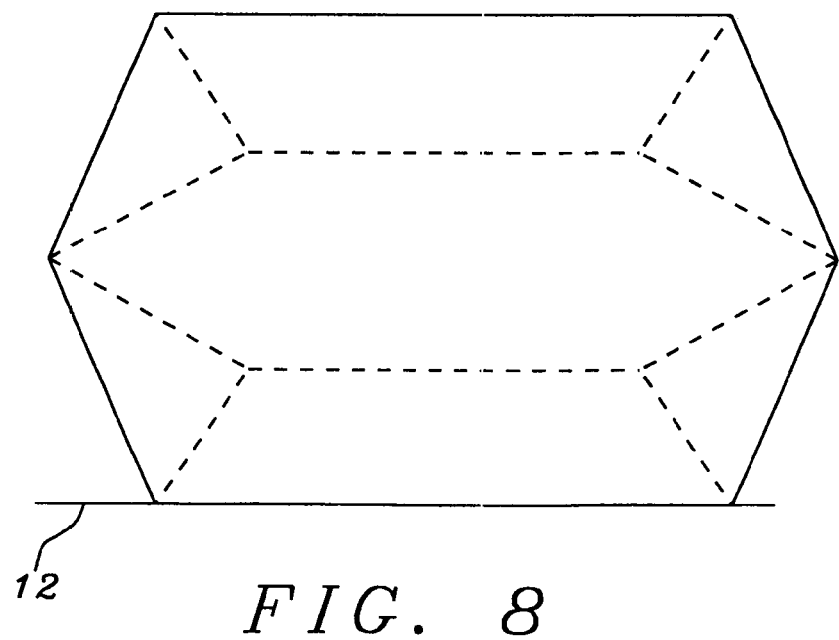
FIG. 8 shows how a hexagonal shield can lead to a stable domain pattern.
Figure 9A:
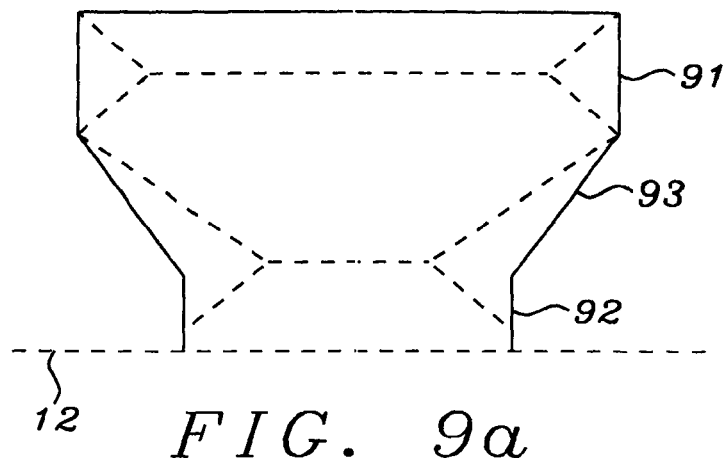
FIGS. 9a and 9b show an irregular octagon which, in this example, has a tab shape.
Figure 9B:
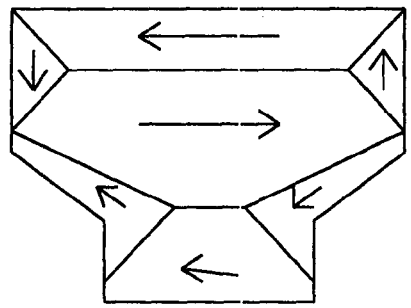

Other shapes that give additional control over shield domain behavior include a modified trapezoid (FIG. 6), a trapezoid with assist features (FIG. 7), a hexagon (FIG. 8), and a 'tab' shape (FIGS. 9a & 9b). Some shapes can stabilize domains into other than the 2-domain state discussed above, so constraints will be required on their aspect ratios.

Figure 6A:
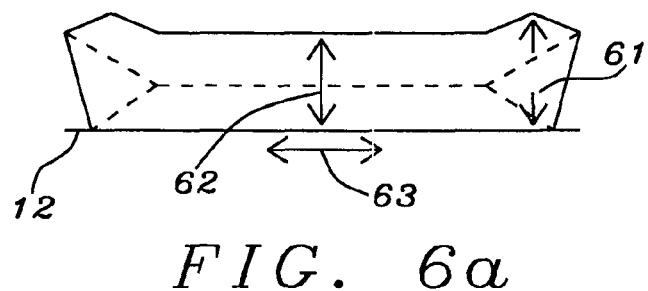
FIG. 6a is a modified trapezoid shield shape substantially similar to a trapezoid but where some material has been added to the back edge.
Figure 6B:
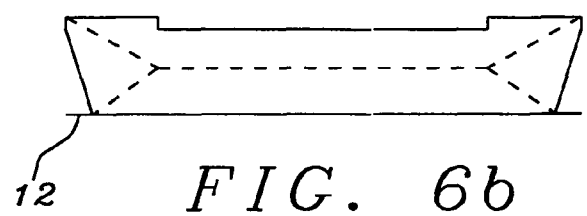
FIG. 6b is similar to 6a but with the added material shaped somewhat differently.
Figure 6C:
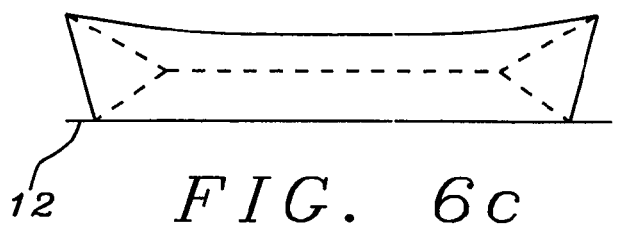
FIG. 6c is similar to 6a and 6b but with the back edge having an arbitrary shape that dips down from high points near the left and right sides.

FIG. 6 illustrates the use of features on the backside of the shield so that reverse nucleation starts there first when the initialization field is reduced. These back edge shapes are typically such that the outer height 61/the central height 62 exceeds about 1.02. We define this inner height as the average height over the central 25% 63 while the outer height is defined as the maximum height over the remaining outer 75% (of the full width) of the shield.

Figure 7:
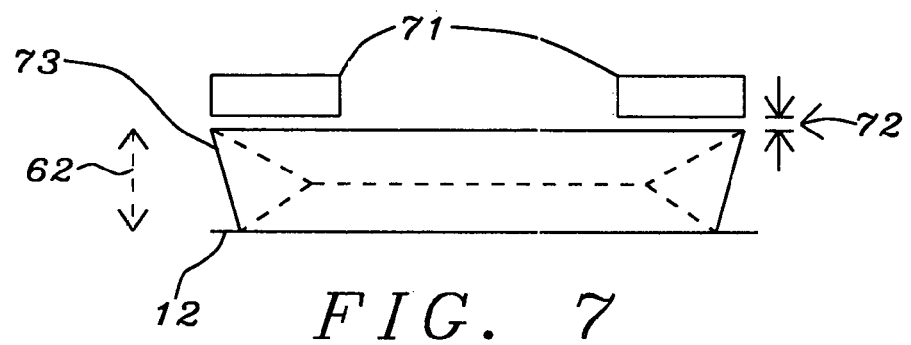
FIG. 7 shows a trapezoid shield shape with detached assist features.

In FIG. 7, assist features, in the form of secondary shields 71 have been added to the back end of the main shield. Typically, the separation 72 (between assist features 71 and back edge 73) is less than shield height 62.

FIGS. 8 and 9a (hexagon and irregular octagon respectively) take advantage of a three-domain generating shape by choosing the correct aspect ratio. In a three domain configuration, reverse nucleation begins at the center of the shape since the demagnetizing field is largest there. The hexagon, as shown in FIG. 8, typically has a width to height ratio of between about 0.25 and 5 while the irregular octagon seen in FIG. 9a has upper and lower vertical edges 91 and 92 respectively connected by sloping edges 93. The domain pattern associated with FIG. 9a is shown in FIG. 9b.

Figure 9C:
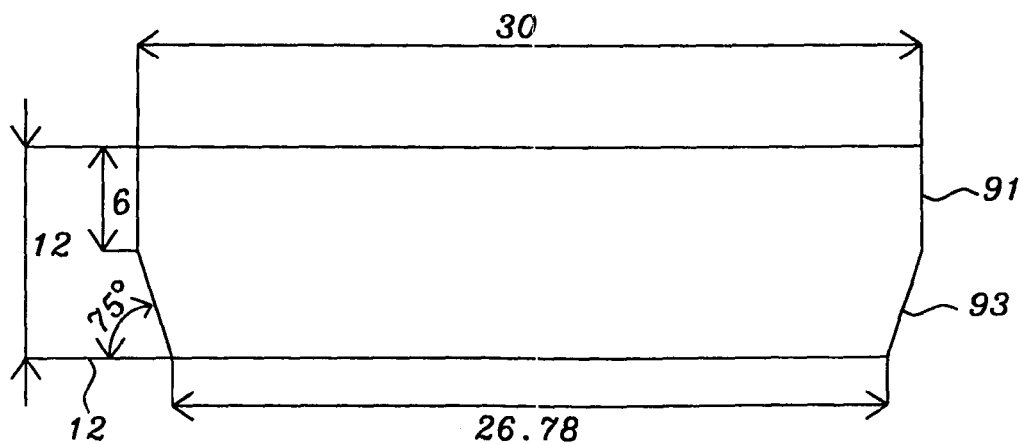

The shape shown in FIG. 9c is an irregular hexagon obtained by removing rectangular section 92 from FIG. 9a. In the interests of full enablement, we have elected to provide dimensions (in microns) for this embodiment as we have found it to be particularly effective. It is, however, to be understood that changes to these dimensions may be introduced without departing from the spirit and intent of the invention, including this particular embodiment, as long as the general shape that is shown in FIG. 9c is retained.

Figure 10:
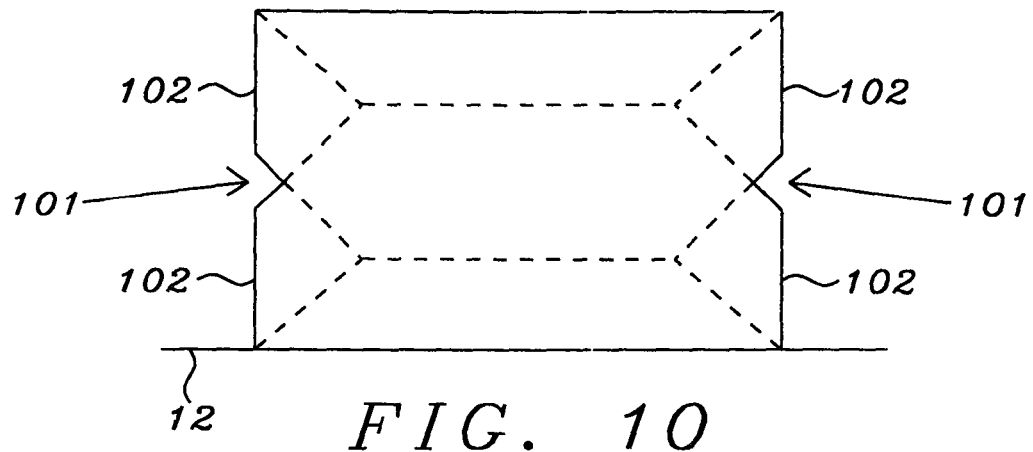
FIG. 10 illustrates a notched shape. The shield side (not including the notch) may be straight or not.

Another approach to domain stabilization involves use of a notch feature as shown in FIG. 10. In the notch concept, the same odd number of notches are designed into each shield side. FIG. 10 illustrates the one notch 101 per side case where it is seen that the notches help to stabilize a 3-domain state. For the notch concept, the shield sides (excluding the notch) may be straight or non-straight but no notch should have a depth that exceeds 10% of the distance between the vertical edges 102.

Note that the upper and lower shields of the full read-write head need not have the same shape or size so that different shapes may be used for them, including the case where only one of the shields is given one of the shapes disclosed above while the other shield continues to have a conventional rectangular shape.

Figure 11:
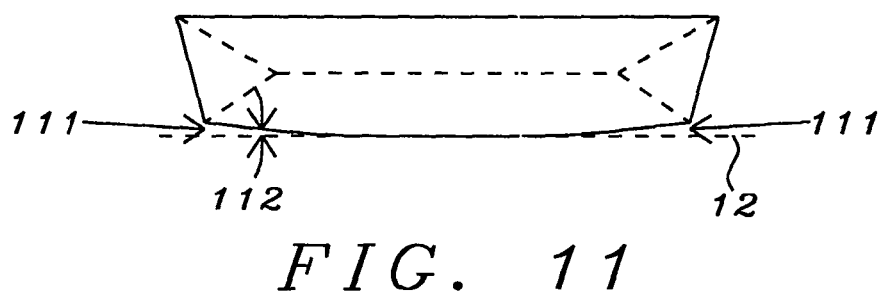
FIGS. 11 and 12 illustrate trapezoidal shapes that include an edge cut, with or without an additional ABS recessed cut.
Figure 12:
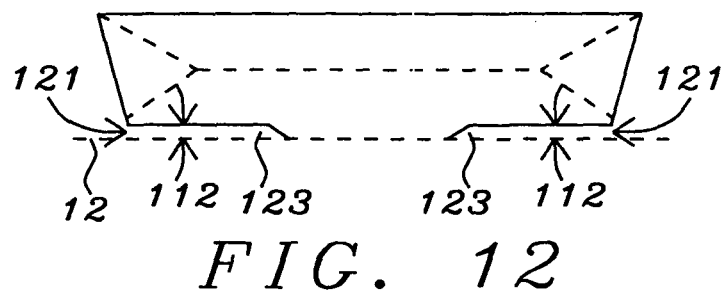

Also, all the shapes disclosed above can be made with or without an additional ABS edge cut feature of the type shown as 111 in FIG. 11 and 123 in FIG. 12. An edge cut feature means that the intersection angle 112 between the ABS and the shield side wall (at the ABS) is small, thereby reducing stray fields at shield corners (which might otherwise induce partial media erasure). Also, all shapes can be made with or without an additional ABS recessed cut feature 121, as shown in FIG. 12. The ABS recessed cut feature facilitates use of narrow rail air bearings.

Figure 13:
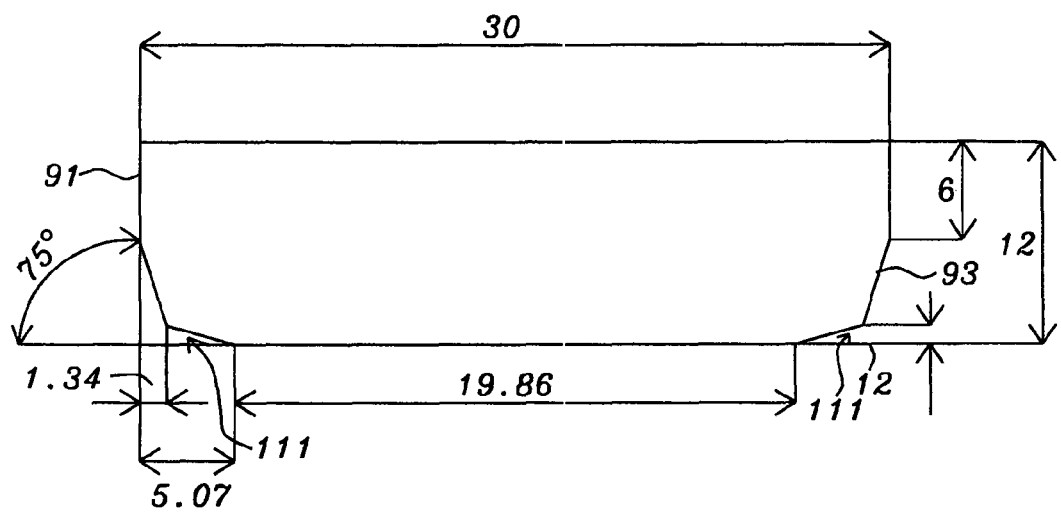
FIG. 13 is the same as FIG. 9c but with edge cut notches, similar to those shown in FIG. 11, added.

The result of adding an edge cut feature of this type to the shape shown in FIG. 9c is illustrated in FIG. 13. As was done for FIG. 9c, dimensions (in microns) are given in FIG. 13. As before, it is to be understood that changes to these dimensions may be introduced without departing from the spirit and intent of the invention, as long as the general shape that is shown in FIG. 13 is retained.

What is claimed is:
1. A magnetic shield, for use in a magnetic read-write head having an air bearing surface (ABS), comprising:
said shield having a shape that is a hexagon and that ensures that all closure domains in said shield are able to align themselves at a reduced angle relative to an initialization direction while still being roughly antiparallel to one another whereby there is only one domain at each non-parallel edge;

said shield having one, and only one, domain along whichever edge of said shield is coplanar with the ABS;

all domain orientations within said shield being consistently repeatable each time said shield is exposed to an initialization field; and said shape having a first edge that is coplanar with the ABS, a second edge parallel to said first edge, said first and second edges being separated by a first distance that is the hexagon's height, a pair of opposing third edges connected to opposing ends of said first edge, and a pair of opposing fourth edges that connect said opposing ends of said second edge to said third edges, the hexagon's width being a maximum distance between a third edge and a fourth edge.

2. The magnetic shield described in claim 1 wherein said width is between about 0.25 and 5 times said height.

* * * * *